US009671567B2

(12) United States Patent
Dobler

(10) Patent No.: US 9,671,567 B2
(45) Date of Patent: Jun. 6, 2017

(54) PLUG PART

(71) Applicant: NEUTRIK AG, Schaan (LI)

(72) Inventor: Oliver Dobler, Eschen (LI)

(73) Assignee: Neutrik AG, Schaan (LI)

( * ) Notice: Subject to any disclaimer, the term of this patent is extended or adjusted under 35 U.S.C. 154(b) by 0 days.

(21) Appl. No.: 14/890,634

(22) PCT Filed: Mar. 27, 2014

(86) PCT No.: PCT/EP2014/000822
§ 371 (c)(1),
(2) Date: Nov. 12, 2015

(87) PCT Pub. No.: WO2014/183821
PCT Pub. Date: Nov. 20, 2014

(65) Prior Publication Data
US 2016/0085031 A1  Mar. 24, 2016

(30) Foreign Application Priority Data

May 15, 2013  (DE) .................. 10 2013 008 266

(51) Int. Cl.
G02B 6/36 (2006.01)
G02B 6/38 (2006.01)
(Continued)

(52) U.S. Cl.
CPC ......... *G02B 6/3825* (2013.01); *G02B 6/3817* (2013.01); *G02B 6/3865* (2013.01);
(Continued)

(58) Field of Classification Search
CPC .. G02B 6/3817; G02B 6/3825; G02B 6/3865; G02B 6/3882; G02B 6/3893; B22D 17/007; H01R 43/16; H01R 13/639
(Continued)

(56) References Cited

U.S. PATENT DOCUMENTS

D278,230 S  4/1985 Kominiak et al.
D316,399 S  4/1991 Wharton
(Continued)

FOREIGN PATENT DOCUMENTS

CN 3269753D 12/2002
CN 3274166D 1/2003
(Continued)

OTHER PUBLICATIONS

EM Trademark Registration 009 351 297, Mar. 29, 2011.
(Continued)

*Primary Examiner* — Akm Enayet Ullah
*Assistant Examiner* — Michael Mooney
(74) *Attorney, Agent, or Firm* — Harris Beach PLLC; Neal L. Slifkin; Luis E. Omaechea

(57) ABSTRACT

A plug part which has at least one plug part housing having at least one elongate plug region for establishing a plug connection with another plug part in a plug-in direction, wherein the plug region has at least one electrical and/or optical plug contact for establishing at least an electrical and/or optical connection with the other plug part, and at least one step is arranged between the plug region and the rest of the plug part housing, wherein the plug part housing is of integral design and the plug region has an outer contour, wherein the outer contour, apart from the ends thereof which are at the end faces as seen in the plug-in direction, is designed to be free of recesses over the entire longitudinal extent thereof in the plug-in direction, or, with at least one recess.

12 Claims, 5 Drawing Sheets

(51) Int. Cl.
  *H01R 13/639* (2006.01)
  *H01R 13/50* (2006.01)
  *H01R 13/627* (2006.01)
  *H01R 43/16* (2006.01)

(52) U.S. Cl.
  CPC ......... *G02B 6/3882* (2013.01); *G02B 6/3893* (2013.01); *H01R 13/50* (2013.01); *H01R 13/6275* (2013.01); *H01R 13/639* (2013.01); *H01R 43/16* (2013.01)

(58) Field of Classification Search
  USPC .... 385/53–92; 439/133, 259, 271, 304, 310, 439/344, 352, 540.1, 577, 578, 607.01, 439/633, 646, 650–652, 655, 660, 676, 439/680, 682, 692, 876
  See application file for complete search history.

(56) References Cited

U.S. PATENT DOCUMENTS

| | | | |
|---|---|---|---|
| D317,289 S | 6/1991 | Fukuda et al. | |
| D322,954 S | 1/1992 | Avramovich | |
| 5,203,718 A | 4/1993 | Chishima | |
| 5,217,390 A | 6/1993 | Nozaki et al. | |
| 5,330,369 A | 7/1994 | Nozaki et al. | |
| 5,660,558 A | 8/1997 | Osanai et al. | |
| 5,774,612 A * | 6/1998 | Belenkiy | G02B 6/3825 385/56 |
| 5,964,605 A * | 10/1999 | Heydorn | H01R 13/633 439/157 |
| 6,116,945 A | 9/2000 | Davis et al. | |
| 6,164,834 A | 12/2000 | Lee | |
| D490,779 S | 6/2004 | Lee | |
| D506,184 S | 6/2004 | Sirichai et al. | |
| D510,071 S | 9/2005 | D'Addario et al. | |
| D512,378 S | 12/2005 | Dobler | |
| 6,997,733 B2 | 2/2006 | Peng | |
| D517,497 S | 3/2006 | Lee | |
| D524,738 S | 7/2006 | Dobler | |
| D543,154 S | 5/2007 | Suckle et al. | |
| D569,810 S | 5/2008 | Victor | |
| D573,103 S | 7/2008 | Lee et al. | |
| D585,025 S | 1/2009 | Kudo | |
| D587,204 S | 2/2009 | Bachmann | |
| 7,488,187 B2 | 2/2009 | Wolf | |
| 7,699,640 B2 | 4/2010 | Brekosky et al. | |
| D626,068 S | 10/2010 | Giefers et al. | |
| D645,022 S | 9/2011 | Lee et al. | |
| D647,849 S | 11/2011 | Yu | |
| D649,970 S | 12/2011 | Lyford et al. | |
| D651,971 S | 1/2012 | Esser et al. | |
| D673,500 S | 1/2013 | Feige et al. | |
| D679,653 S | 4/2013 | Dobler | |
| D683,701 S | 6/2013 | Svelnis et al. | |
| D686,579 S | 7/2013 | Fujioka | |
| D691,560 S | 10/2013 | Wang | |
| D691,949 S | 10/2013 | Torma | |
| D692,381 S | 10/2013 | Torma | |
| D706,117 S | 6/2014 | Toimil et al. | |
| D748,059 S | 1/2016 | Kuhnert | |
| D755,720 S | 5/2016 | Dobler | |
| D768,080 S | 10/2016 | Parks | |
| 2004/0131315 A1 | 7/2004 | Onogawa et al. | |
| 2006/0172578 A1 | 8/2006 | Parsons | |
| 2007/0049099 A1 | 3/2007 | Potters | |
| 2009/0215302 A1 | 8/2009 | Roberts | |
| 2010/0014812 A1 | 1/2010 | Dobler | |
| 2013/0273767 A1 | 10/2013 | Phan et al. | |
| 2013/0288510 A1* | 10/2013 | Svelnis | H01R 13/6275 439/350 |
| 2015/0044898 A1 | 2/2015 | Dobler | |
| 2016/0085031 A1 | 3/2016 | Dobler | |

FOREIGN PATENT DOCUMENTS

| | | |
|---|---|---|
| CN | 3275196D | 1/2003 |
| DE | 10 2009 007 298 B3 | 9/2010 |
| DE | 102009007298 B3 | 9/2010 |
| EM | 000 152 970-0002 | 6/2004 |
| EM | 000 152 970-0003 | 6/2004 |
| EM | 000 152 970-0004 | 6/2004 |
| EM | 000 152 970-0006 | 6/2004 |
| EM | 000 445 218-0001 | 2/2006 |
| EM | 000 445 218-0002 | 2/2006 |
| EM | 000 445 218-0003 | 2/2006 |
| EM | 000 649025-0001 | 3/2007 |
| EM | 000 741 152-0001 | 7/2007 |
| EM | 001 229 827-0001 | 8/2010 |
| EM | 001 229 827-0002 | 8/2010 |
| EM | 001 229 827-0003 | 8/2010 |
| EM | 001 229 827-0004 | 8/2010 |
| EM | 001 229 827-0005 | 8/2010 |
| EM | 001 229 827-0006 | 8/2010 |
| EM | 001 229 827-0007 | 8/2010 |
| EM | 001 229 827-0008 | 8/2010 |
| EM | 001 229 827-0009 | 8/2010 |
| EM | 001 229 827-0010 | 8/2010 |
| EM | 001 229 827-0011 | 8/2010 |
| EM | 001 229 827-0012 | 8/2010 |
| EM | 001 371 843-0001 | 5/2013 |
| EM | 001 371 843-0002 | 5/2013 |
| EM | 001 371 843-0003 | 5/2013 |
| EM | 001 371 843-0004 | 5/2013 |
| EM | 001 371 843-0005 | 5/2013 |
| EM | 001 371 843-0006 | 5/2013 |
| EM | 001 371 843-0007 | 5/2013 |
| EM | 001 371 843-0008 | 5/2013 |
| EM | 001 371 843-0009 | 5/2013 |
| EM | 001 371 843-0010 | 5/2013 |
| EM | 001 386 684-0001 | 10/2013 |
| EM | 001 386 684-0002 | 10/2013 |
| EM | 001 386 684-0003 | 10/2013 |
| EM | 001 386 684-0004 | 10/2013 |
| EM | 001 386 684-0005 | 10/2013 |
| EM | 001 386 684-0006 | 10/2013 |
| EM | 001 386 684-0007 | 10/2013 |
| EM | 001 386 684-0008 | 10/2013 |
| EM | 001 386 684-0009 | 10/2013 |
| EM | 001 386 684-0010 | 10/2013 |
| EM | 001 386 684-0011 | 10/2013 |
| EM | 001 386 684-0012 | 10/2013 |
| EM | 001 386 684-0013 | 10/2013 |
| EM | 001 386 684-0014 | 10/2013 |
| EM | 001 386 684-0015 | 10/2013 |
| EP | 0 161 835 A2 | 11/1985 |
| EP | 161 835 A2 | 11/1985 |
| EP | 161 835 A3 | 11/1985 |
| EP | 757 411 A2 | 2/1997 |
| EP | 757 411 A3 | 10/1997 |
| EP | 0 898 333 A2 | 10/1998 |
| EP | 1 172 897 A2 | 1/2002 |
| EP | 0 898 333 B1 | 2/2002 |
| EP | 1 317 025 A2 | 11/2002 |
| EP | 1 172 897 A3 | 3/2003 |
| EP | 1 416 588 A1 | 10/2003 |
| GB | 2 071 928 A | 9/1981 |
| JP | H 01 29985 Y2 | 9/1989 |
| JP | 2 811 650 B2 | 11/1991 |
| JP | 05-144512 A1 | 6/1993 |
| JP | H 05-144 512 A | 6/1993 |
| JP | 2000-164 296 A | 6/2000 |
| JP | 2012-243 565 A | 12/2012 |
| WO | 2004105197 A1 | 12/2004 |
| WO | 2005046007 A1 | 5/2005 |
| WO | 2008043115 A1 | 4/2008 |
| WO | 2012083939 A2 | 6/2012 |

(56) References Cited

FOREIGN PATENT DOCUMENTS

WO     2014075751 A1     5/2014
WO     2014183821 A1     11/2014

OTHER PUBLICATIONS

EM Trademark Registration 009 351 305, Mar. 29, 2011.
EM Trademark Registration 003 717 303, Jul. 3, 2006.
EM Trademark Registration 003 717 361, Oct. 24, 2005.
EM Trademark Registration 002 382 786, Jul. 4, 2005.
Product Guide 2012/13; Published Mar. 21, 2012, Front Page and pp. 3, 7, 12, 13, 14, 15, 16, 17, 23-30, 50, 58, 64, 66-71, 79, 82, 83, 89-91, 94, 96, 98-99, 115-117, 120-122.
German Search Report of DE Priority Application 10 2013 008 264.1.
Neutrik NE8FDP, dated May 4, 2012, [online], [site visited Dec. 5, 2016]. Available from Internet, <URL: http://www.focusattack.com/neutrik-ne8fdp-rj45-feed-through-black/>.

* cited by examiner

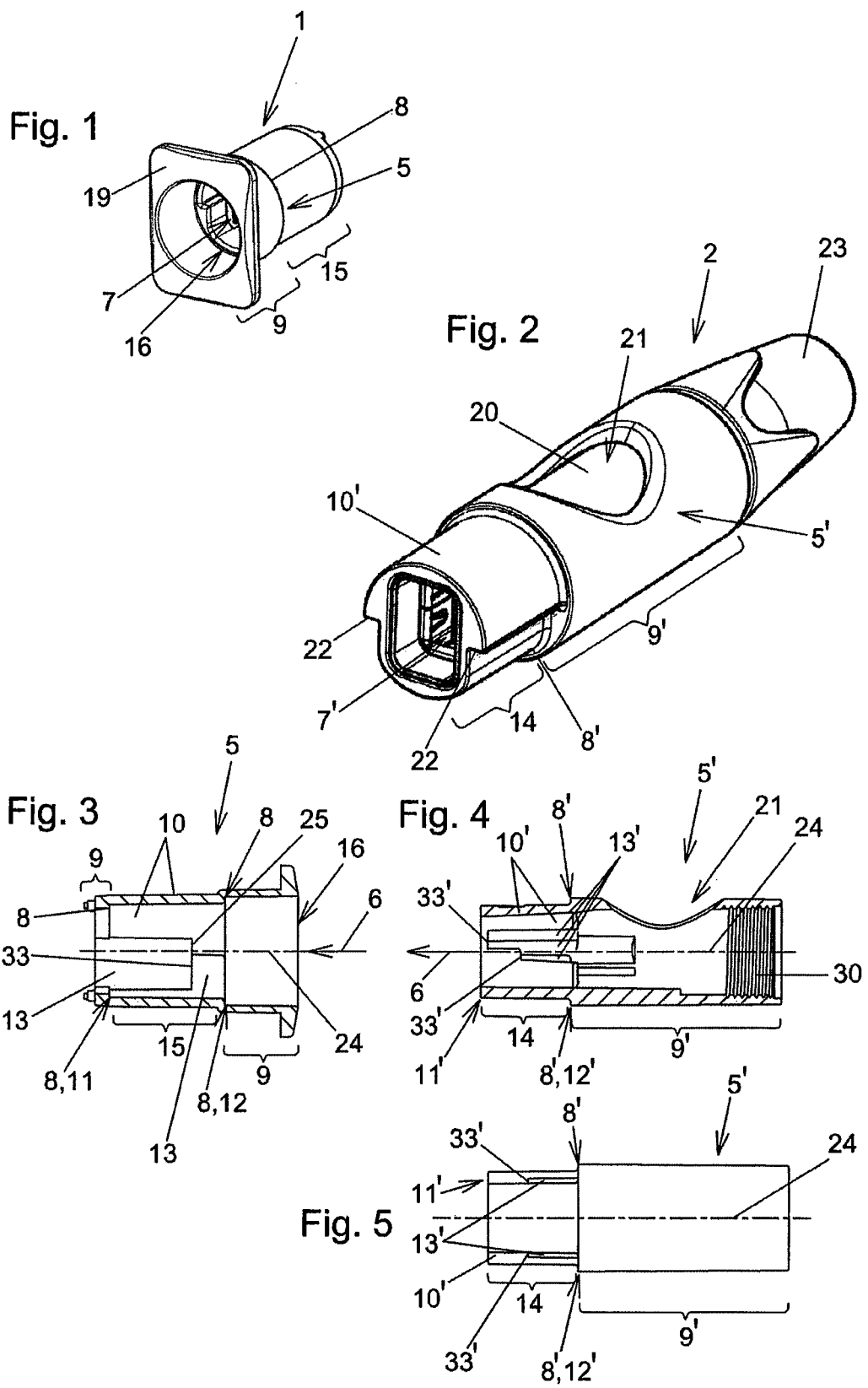

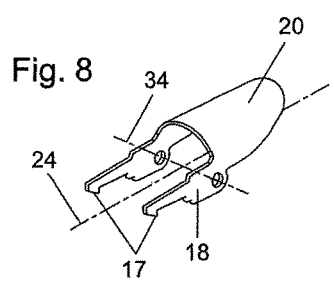
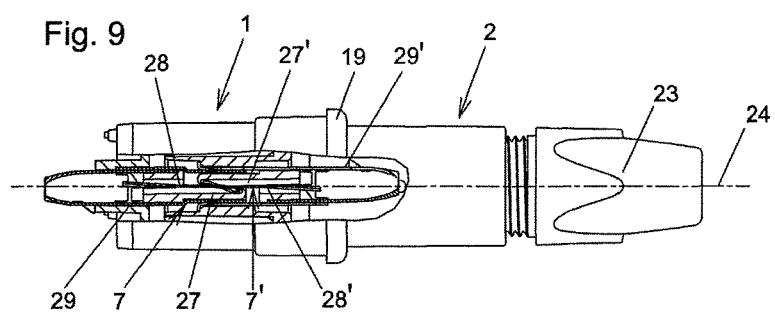

PLUG PART

CROSS-REFERENCE TO RELATED APPLICATIONS

This application is a national stage application under 35 U.S.C. §371 of PCT Application No. PCT/EP2014/000822, filed Mar. 27, 2014, which claims priority to and the benefit of German Patent Application No. DE 10 2013 008 266.8, filed May 15, 2013, which is incorporated herein by reference in its entirety.

STATEMENT REGARDING FEDERALLY FUNDED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The present invention relates to a plug part, which has at least one plug part housing with at least one longitudinally extended plug region to produce a plug connection with another plug part in a plug-in direction, in which the plug region has at least one electrical and/or optical plug contact to establish a plug connection with another electrical connector, and there is at least one step arranged between the plug region and the rest of the plug part housing. Furthermore, the invention also relates to a method to produce such a plug part.

Background Art

Generic plug parts are used, e.g., in the audio sector to establish electrical connections between a cable and another cable or a cable and an electrical device. They are used, e.g., as a microphone plug. Generic plug parts can also just be used to establish an optical connection, e.g., to connect fiberoptic cables to one another. Also hybrid forms for the simultaneous transmission of electrical and optical data and/or power are possible.

A corresponding plug connection is made when at least two matching plug parts of this kind are put together in the corresponding manner, with the electrical and/or optical plug contacts being connected to one another accordingly with the establishment of the plug connection. This usually occurs automatically during the mating of the plug parts.

Plug parts of this kind to establish a purely electrical plug connection are depicted, e.g., in EP 1 416 588 A1. The connector part shown in FIG. 1 of this document of the prior art is the plug part housing in several parts or designed in several parts to be able to include a locking device to lock both plug parts to one another. The plug part of this document depicted in FIG. 2 in the plug region has a recess completely penetrating the wall of the plug region in order to receive the locking nose of the other plug part.

Both plug parts shown in this citation have the disadvantage that their plug part housings are quite expensive to produce.

The task of the invention is to provide plug parts with plug part housings that are as easy to produce as possible.

BRIEF SUMMARY OF THE INVENTION

For plug parts of the above-mentioned kind it is intended that the plug part housing be designed as one piece and the plug region have an outer contour, with the outer contour, apart from its front ends, viewed from the plug-in direction, constructed over its entire longitudinal extension free of recesses or, in case of the presence of at least one recess, extending in a direction parallel to the plug-in direction up to at least one of the front ends of the outer contour.

Thus, in contrast to the abovementioned prior art, according to the invention, on the one hand, it is planned that the plug part housing no longer be made from several parts but from one part. Additionally, it is also intended that all recesses that may exist in the outer contour of the plug region extend parallel to the plug-in direction up to at least one front end of the outer contour and therefore of the plug region. In other words, holes or recesses running crosswise to the plug-in direction that do not extend up to the front end of the outer contour of the plug region will be omitted. In other words again, it is therefore intended that the outer contour of the plug region have no recess; that means it is designed free of recesses, or, if such recesses exist, that they are not designed in the shape of holes on both sides of the plug region or its outer contour, viewed from the plug-in direction. This enables an easy production of the plug region and therefore the plug part housing as no drillings, holes or the like running crosswise are to be produced with special tools in the plug region.

Especially preferred embodiments of the invention provide in this connection that the plug part housing be a one piece casting part produced from one casting. Particularly preferred is a die casting. Also injection-molded parts, especially metal injection-molded parts, are possible.

An inventive method to produce the plug part according to the invention therefore provides conveniently that the plug part housing be produced with a casting process, preferably with a die casting. Especially with the casting or die casting processes, because of the special embodiment of the plug region, the slider and the like that run crosswise to the plug-in direction or the longitudinal direction of the plug part housing can be omitted. As a result, the relatively easy casting or die casting shapes as well as a relatively quick implementation of the casting or die casting process are possible.

The electrical and/or optical plug contact is the component of the plug part with which the actual electrical and/or optical contact occurs. Preferably the plug contact is arranged within the plug region of the plug part housing. Preferably there is at least one electrical and/or optical plug contact of the plug part accessible via one of the front ends of the plug region, viewed from the plug-in direction.

The one step at least between the plug region and the rest of the plug part housing is preferably one of the front ends of outer contour of the plug region. The step is preferably formed completely around the plug part housing. Conveniently it runs crosswise, preferably orthogonally to the plug-in direction and/or the longitudinal direction of the plug part. The step is part of the plug part housing and is at least one end of the outer contour of the plug region. This outer contour of the plug region is formed through the surfaces of the plug part housing in the area of the plug region. It can point outwards or just as well limit an inner hollow space of the plug region.

Generally speaking, the plug region is an area of the plug part, which serves as the actual plug connection with another plug part. It can be formed differently. E.g., it can be a receiving sleeve area with at least one plug-in opening, in which the plug region of the other plug part can be inserted in the plug-in direction of the plug part. The receiving sleeve area is therefore a part of the plug connection, which is formed as a kind of hollow or rather as the female part. The plug region of the other plug part will be inserted in this receiving sleeve area to establish a plug connection. The plug region is therefore the male part, preferably an area of the plug part that protrudes over the rest of the plug part housing, which is inserted in the receiving sleeve area of the other plug part to establish a plug connection.

The recesses that extend in a direction parallel to the plug-in direction up to the front end of the plug region can completely penetrate the wall of the plug part housing or can be formed as depressions that do not completely penetrate this wall.

In terms of an especially easy way to produce the plug part housing or rather the plug part, in case of the existence of at least two recesses, it is conveniently provided that they extend parallel to plug-in direction up to the front end of the outer contour. It is intended as especially preferable if the outer contour, apart from its front ends as viewed in the plug-in direction and apart from recesses, that may be existing in the end areas, preferably everywhere, are parallel or at least almost parallel to the plug-in direction. 'Almost parallel' is understood to be all slightly angular courses, which deviate a maximum of plus/minus 1° from the parallel, which simplify the demoldability of production tools.

The plug region of the plug part housing has in preferred embodiments in its outer contour at least one section to secure its anti-rotation lock and/or a clear mating position. This can be grooves, ridges or the like. These sections prevent two joined plug parts from being rotated counter to one another. They can also serve to ensure that the plug parts can be plugged together in a single, namely, the correct position relative to one another. Especially preferred embodiments of the plug parts according to the invention stipulate that the plug region has a mushroom-like shape in a front view.

The preferred embodiments of the invention stipulate that at least one inventive plug part of a plug connection has a locking mechanism, with which the plug parts can be detachably locked together in the connected state. It is especially preferred that the recess, extending in a direction parallel to the plug-in direction up to one of the front ends of the outer contour, has a locking pin arranged to lock the plug part with another plug part. The locking pin is the part of the locking mechanism that engages with or engages behind the locking pin counterpart of the other plug part in order to lock the plug part together. Such a locking counterpart can, e.g., be executed in form of an undercut. Preferred embodiments provide in this connection that the locking pin can be actuated by a pivotably mounted locking lever or is part of a pivotable locking lever.

Conveniently it is provided that the locking lever can be actuated by hand, whereby it is especially preferable that the plug part have an actuating surface to actuate the locking lever by hand. The actual physical form of an existing pivot axis pin or, in case of a cup support, an invisible pivot axis, around which the locking lever is pivotable, is conveniently between the point and/or area at which the actuating surface directly or also via a push or pull element works on the locking lever, and the locking pin(s). Hereby especially convenient lever conditions are realised so that small movements make a secure locking and unlocking possible.

Preferred embodiments provide that the locking pin is mounted in a first plug part and/or part of the first plug part and engages with the locking pin counterpart of a second plug part for the locking. Conveniently every locking pin is allocated its own locking pin counterpart. The locking pin counterpart(s) can, e.g., be embodied in the shape of an undercut, preferably of the second plug part. Especially preferred variants of the invention provide that the locking pin counterpart is located in the undercut of the receiving sleeve area.

Plug parts according to the invention can be executed as cable plugs as well as a device connector. The two plug parts to be connected can each be cable connectors. This is intended if two cables are to be connected to one another. It can also be intended that one plug part is a cable plug that is to be attached to a cable and the other to a corresponding plug part as a device connector, which is attached or to be attached to an electrical device such as an amplifier. The combination of cable plug and device connector is always chosen when a cable is to be plugged into a device with a corresponding plug connector.

Plug parts according to the invention can be used for a purely electrical connection, e.g., as an audio plug-in, but also be used as a purely optical plug-in connection. Hybrid forms are also possible, with the plug parts serving as a connection between electrical as well as optical lines. To establish a plug connection, at least two plug parts are necessary, which then will be plugged together accordingly to establish the plug connection.

BRIEF DESCRIPTION OF THE DRAWINGS

Further features and details of preferred embodiments of the invention are depicted in the following figure description. They have:

FIGS. 1 to 9 representations of a first plug connection with two plug parts according to the invention and FIGS. 10 to 17 representations of a second plug connection with another two plug parts according to the invention.

DETAILED DESCRIPTION OF THE INVENTION

FIG. 1 shows a first plug part 1 according to the invention, which is depicted here as a device connector. The corresponding second plug part 2 is shown in FIG. 2. The plug parts 1 and 2 are being plugged together to establish a plug connection. Plug part 2, according to the invention, is a so-called cable plug. This can be seen by cable sleeve 23, which serves to insert the cable, which is not depicted here, into the plug part housing 5', to complete the corresponding connections to the plug contacts 7'.

Figure 6:
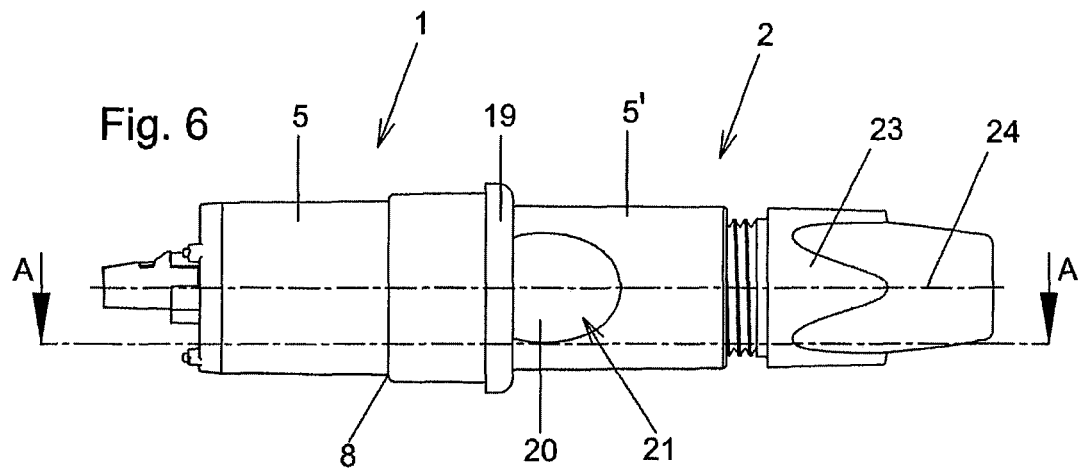
Figure 7:
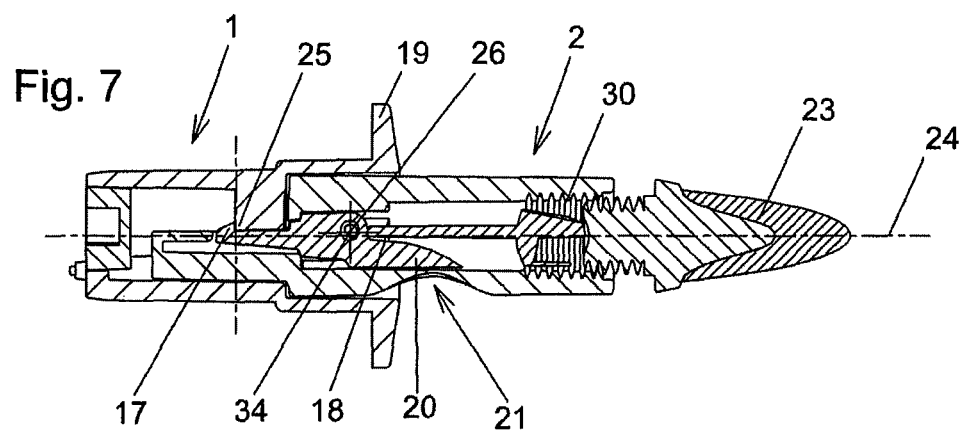
Figure 14:
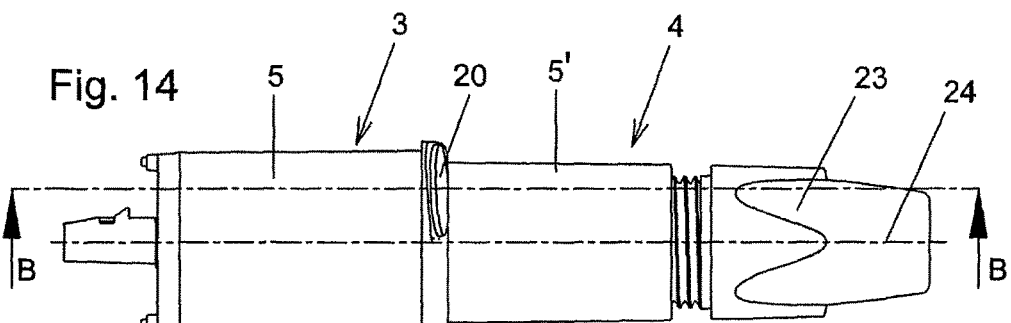
Figure 15:
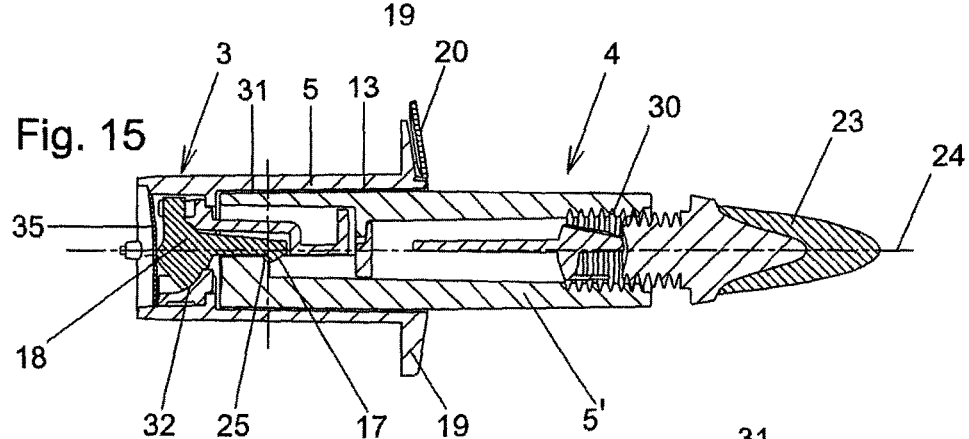
Figure 17:
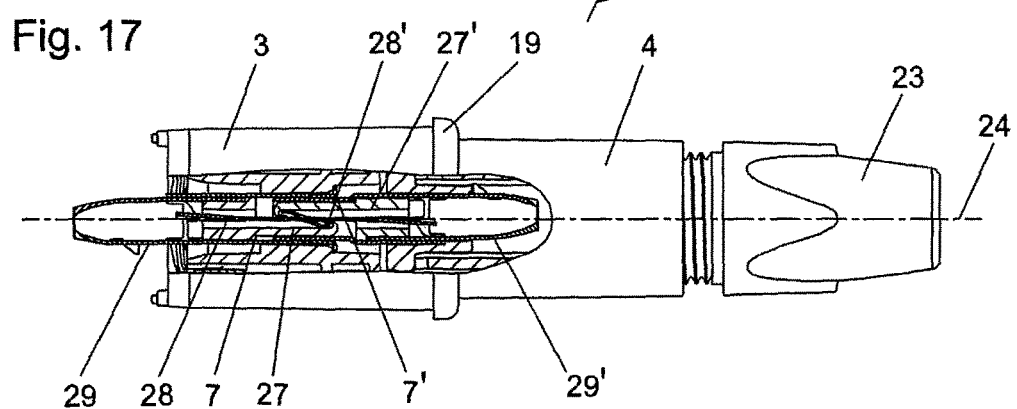

The cable sleeve 23 is shown in a position in the first embodiment example in FIGS. 6, 7 and 9, as well as in the second embodiment example in FIGS. 14, 15 and 17, in which is not yet fully screwed-in the respective plug part housing 5' or rather its threads 30. In the fully mounted position cable sleeve 23 is screwed-in deep into the thread 30 of the respective plug part housing 5'. How deep the screwing-in is possible can depend on the diameter of the cable.

The plug part 1 in the form of a device connector depicted in FIG. 1 has an aperture 19. The plug part housing 5 of such plug part 1 in the shape of device connectors is in the fully mounted condition usually arranged so it is concealed within the respective device up to aperture 19. In the fully mounted position of the respective device usually only aperture 19 and the plug-in opening 16, parts of the receiving sleeve area 15 as well as the plug contact 7 arranged therein are visible.

The plug region of the plug part 1 is formed as a hollow-like receiving sleeve area 15. When plugging together plug parts 1 and 2 of the plug region 14 of the plug part 2, depicted in FIG. 2, they will be inserted into receiving sleeve area 15. This pushing-in when plugging together plug part 1 and 2 takes place in the plug-in direction 6, as drawn in FIGS. 3 and 4. The plug part housing 5 of the plug part 1 includes next to the receiving sleeve area 15 also the rest of the plug part housing 9, whereby it is indicated that plug part housing 5, as mentioned in the beginning, is formed of one piece. The plug region, here in the shape of receiving sleeve area 15 and the rest of plug part housing 9 are therefore formed as one piece, preferably one cast part produced from casting or die casting.

The same is true for the plug region in the form of the plug-in region 14 of plug part 2 and the plug part housing 9' implemented there. These parts together form an plug part housing 5'. Here also it is an especially preferred one piece cast part produced by casting or die casting.

As can be seen in FIG. 2, in the area of the rest of the plug part housing 9' a recess 21 is provided, through which the actuating surface 20 of the locking lever 18, which will be described later in the text, is accessible.

Both plug parts 1 and 2 have at least one step 8, 8' arranged between the plug regions in the form of the receiving sleeve area 15 or rather the plug region 14 and the rest of plug part housing 9, 9'. In the embodiment examples shown this step 8, 8' is circumferentially enclosed around the entire plug part housing 5, 5'. The step 8, 8' runs in a direction orthogonal to the plug-in direction 6. In the embodiment examples shown the plug-in direction 6 corresponds to the longitudinal direction of the respective plug parts 1 and 2. It runs parallel to central longitudinal axis 24. In FIG. 2 it is easy to see that the plug region in the shape of plug-in area 14 of this plug part 2 has a mushroom-like shape of the outer contour 10'. Virtually below the cap of this mushroom shape the outer contour 10' has surfaces 22, which run parallel to, or in a radial direction as viewed from, the central longitudinal axis 24. There is a recess 13', executed according to the invention, located on the surfaces 22, extending in the direction parallel to the plug-in direction 6 up to a front end 12' of the outer contour of 10', in which a locking pin 17 is arranged to lock the plug part 2 with the plug part 1. These recesses 13', in which locking pin 17 is arranged, are easy to see in FIG. 5.

The corresponding mushroom shape is also realised at plug-in opening 16 and the receiving sleeve area 15 of the plug part 1 according to FIG. 1, even if the mushroom shape of the outer contour 10 is not fully visible in FIG. 1.

The plug contacts 7, 7' of plug parts 1 and 2 executed only as purely electrical contacts in this embodiment example are accessible, as seen as from the plug-in direction 6, via one of the front ends 11 or 12 of the respective plug region, which means plug-in area 14 or the receiving sleeve area 15. The respective plug contacts 7, 7' are arranged within the aforementioned plug regions.

As mentioned above, the embodiments of plug part 1 according to the invention can be used to establish at least an electrical as well as an optical plug connection as well as a combination of both. In the embodiment example shown is a purely electrical plug connection using plug contacts 7. These plug contacts 7, in the embodiment example shown, are similar to a USB (Universal Serial Bus) plug. With this kind of electrical contacting the electrical contacts 28, 28' of the respective plug contact 7, 7' are here designed as a flexible leaf spring supported by a disc-like contact carrier 27, 27'. Contact carrier 27, 27' and electrical contacts 28, 28' are located within a contact housing 29, 29'. The special character of this kind of electrical plug connection consists in the fact that both parts, which are connected to one another, have the same geometry as the respective electrical contacts 28, 28' and the contact carrier 27, 27'. In this embodiment example two electrical contacts 28, 28' are provided on one contact carrier 27, 27' per plug part or rather plug contact 27, 27'. The number of electrical contacts 28, 28' and also the size of the contact carrier 27, 27' can of course vary. FIG. 9 is a partly fragmented representation of the plugged together position of plug parts 1 and 2, the contacting is visible, which is namely the pairwise touching of the electrical contacts 28, 28' of the respective plug parts 1 and 2. It is also visible that the contact housing 29, 29' of the plug contacts 7, 7' of the respective plug parts 1 and 2 are interlocking or engage around one another when plugged together and therefore seal the area around the electrical contact 28, 28' from the outside. In FIG. 9 it is easy to see that the contact housing 29, 29' in this embodiment example forms a kind of sealing shell around the electrical contacts 28, 28' and the contact carrier 27, 27'.

FIG. 3 shows a longitudinal cut through the plug part housing 5 of the plug part 1 according to FIG. 1, in which all built-in components, especially plug contact 7, have been removed from receiving area 15. It is easy to see that the receiving sleeve area 15 of this plug part housing 5 of the plug part 1 in the plug-in direction 6 is extending between two steps 8.

Those two steps 8 form the front ends 11 and 12 of the receiving sleeve area 15 and limit them against the areas of the rest of plug part housing 9. The outward pointing outer contour 10 of the receiving sleeve area 15 of plug part 1 is over its entire longitudinal extension, as viewed from plug-in direction 6, free of recesses 13. Recesses in the outer contour 10 of the receiving sleeve area 15 are located only at the inward pointing part of the outer contour 10, which surrounds the hollow space of the receiving sleeve area 15, into which the plug-in area 14 of the other plug part 2 is pushed to establish a plug connection. It is easy to see in FIG. 3 that each of the recesses 13 in the outer contour 10 in the receiving sleeve area 15, as viewed from plug-in direction 6, is limited by one end area 33 at the most. Each of these recesses 13 extends in the direction parallel to the plug-in direction 6 up to at least one of the front ends 11 and 12 of the outer contour 10 of the receiving sleeve area 15.

This applies also to the plug-in area 14 of the plug part 2. FIG. 4 depicts a longitudinal cut through the plug part housing 5' of this plug part 2; FIG. 5 depicts a view from outside. At the plug part housing 5' of the plug part 2 there is also a fully circumferential step 8' between the plug-in area 14 and the rest of the plug part housing 9'. This step 8' also forms the front end 12' of the plug-in area 14. The opposite end in the plug-in direction 6, front end 11' does not have a step in this embodiment example of the plug part according to the invention. In FIGS. 4 and 5 it is easy to see that all recesses 13' here also extend in the direction parallel to the plug-in direction 6, up to at least one of the front ends 11' or 12' of the outer contour 10'. There is no recess 13' in the outer contour 10', neither in the inward nor the outward pointing part, which would be limited within the plug-in area 14 by two end areas 33' distanced from one another in the plug-in direction 6.

FIG. 6 shows the fully established plug connection between the plug parts 1 and 2 according to FIGS. 1 and 2 from outside. FIG. 7 shows the cut along the cut line AA. Here the operation of the realized locking mechanism in the shape of the locking lever 18 mounted on the pivot axis pin 26 around the pivot axis 34 is easy to see. The locking lever 18, on the one hand, has an actuating surface 20 and, on the other hand, as viewed from the opposite side, the pivot axis 34 has a locking pin 17. FIG. 8 shows this locking lever 18 of this embodiment example detached from the other components. How the pivot axis 34 is pivotable around the locking lever 18 and runs around the central longitudinal axis 24, is depicted as a dotted line in FIG. 8. In the locking position depicted in FIG. 7 the locking pin 17 engages behind the locking counterparts 25 of plug part 1, with it being pointed out that the locking lever 18 is mounted over the pivot axis pin 26 at plug part 2. The locking counterpart 25 is a recess 13 at the end area 33, which extends in the plug-in direction 6 to the front end 11. The locking counterpart 25 is also drawn in FIG. 3.

Figure 7A:
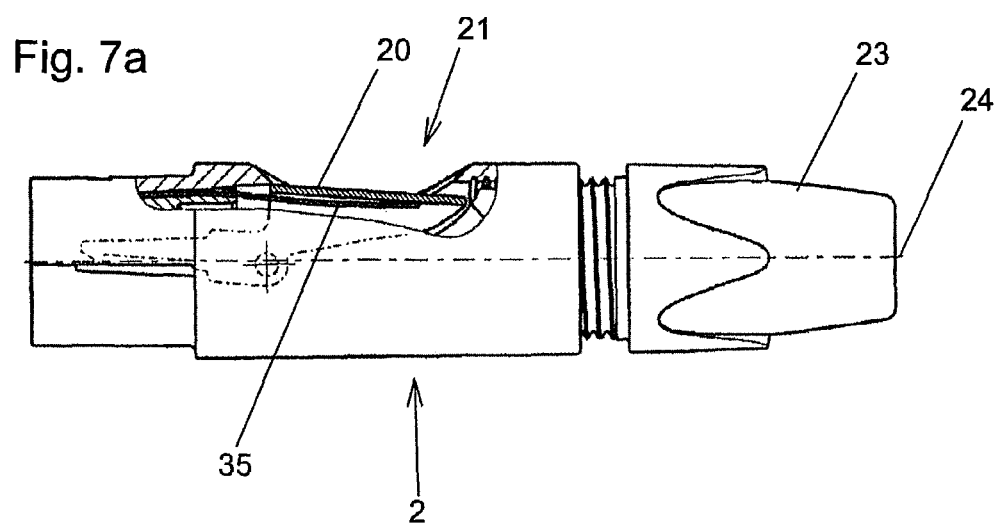

When pressing on the actuating surface 20, the locking lever 18 is pivoted from the locking position, depicted in FIG. 7, into an unlocking position, in which the locking counterpart 25 cannot engage behind anymore so that plug parts 1 and 2 can be pulled apart from one another opposite to the plug-in direction 6. The resetting of locking lever 18 from the unlocking position into the locking position can conveniently be initiated through a spring load. The preloading spring depicted in FIG. 7a preloading spring 35 is provided to this end in the first embodiment example.

FIG. 8 shows as an example that preferred embodiments of the corresponding locking lever 17 two locking pins 18 at a distance from one another, located on opposite sides of the central longitudinal axis 24. The movement of the locking pins 17 between the locking and the unlocking position should conveniently occur with at least one tangential component regarding the central longitudinal axis. But it can also be one purely tangential movement. But tangential in this sense are also the movements that are not purely radial, as viewed from the central longitudinal axis, and has at least one tangential component.

Figure 10:
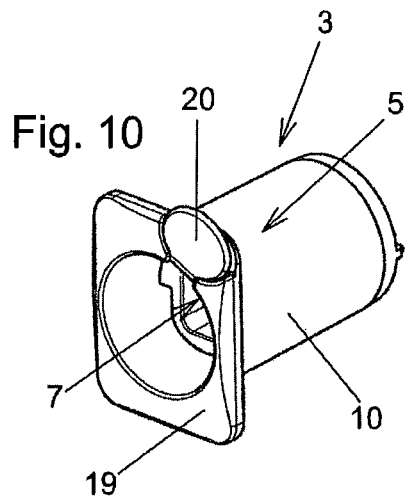
Figure 11:
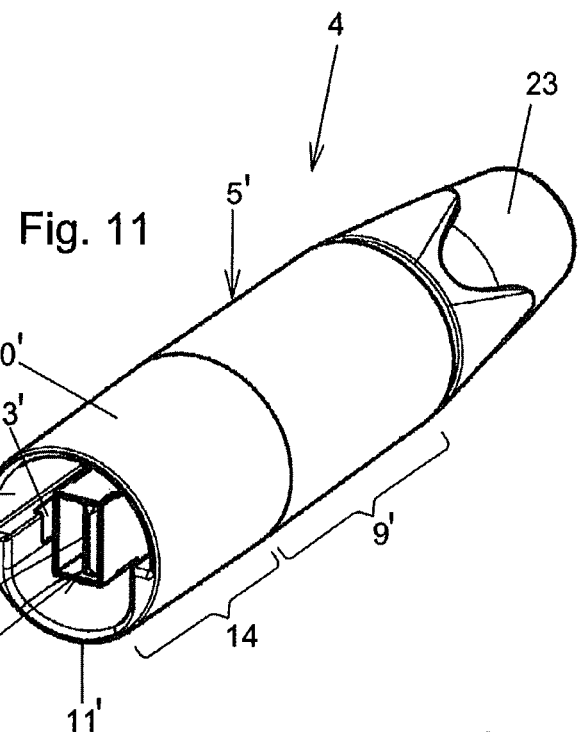
Figure 16:
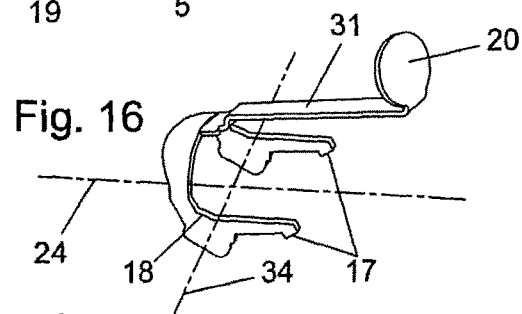

The second embodiment example according to FIGS. 10 to 17 is about a variant of the invention, in which the plug part 3 has the form of a device connector and the plug part 4 is in the form of a cable plug. The locking mechanism of the locking lever 18 is a component of plug part 3, the device connector. Also in FIG. 14, in which the plugged together position is depicted again, this is easy to see from the actuating surface 20. FIGS. 10 and 11 show the plug parts 3 and 4 in a position pulled apart from one another. FIG. 15 shows the cut along the cut line BB from FIG. 14. FIG. 16 depicts the locking mechanism of this second embodiment example detached from other parts of the plug connection. FIG. 17 is essentially similar to FIG. 9, once again the electrical contacting in this embodiment example, which is executed as in the first embodiment example.

Besides the kind of the electrical contacting design there are several other similarities between the second embodiment example, as shown in FIGS. 10 to 17, and the first embodiment example, as shown in FIGS. 1 to 9; therefore the focus will be mainly on the differences. Apart from this, the explanations for the first embodiment example are applicable accordingly to the second embodiment example.

FIG. 11 allows a view through the plug-in opening 16 through the plug-in area 14 of plug part 4, here executed as a cable plug. On the first side the locking counterpart 25, which here has the shape of an undercut, is easy to see in the inner part of the plug-in area. This plug-in area 14 is inserted into the receiving sleeve area 15 of the other plug part 3 when in the plugged together position. In FIGS. 10 and 11 it may be seen that the plug-in area 14 as well as the receiving sleeve area 15 have a mushroom shape that is corresponds with one another. FIG. 10 also depicts well that the actuating surface 20 is arranged in a corner, which has an aperture essentially rectangular in shape, this makes aperture 19 and actuating surface 20 require relatively little space. This has the advantage that these plug parts 3 in the shape of a device connector can be arranged quite closely next to the corresponding electrical device.

In FIG. 15 it is easy to see the mode of operation and the structure of the locking mechanism of this second embodiment example. FIG. 16 shows this locking mechanism detached from other components. Also in the second embodiment example the locking mechanism shows a pivotably mounted locking lever 18 and two locking pins 17 located on opposite sides of the central longitudinal axis 24. A first difference from the first embodiment example is the bearing cup 32 of the locking lever 18 realized here. In contrast to the first embodiment example, there is no pivot axis pin 26 provided here. The locking lever 18 rather is, as is easy to see in FIG. 15, located in the bearing cup 32 of the plug part 3; therefore the axis holes of the first embodiment example can be omitted. Another difference from the first embodiment example is that the actuating surface 20 does not influence the locking lever 19 directly but through a pushing element 31. A similarity to the first embodiment example is that the pivot axis 34, again drawn as a dotted line in FIG. 16, is located between the locking pin 17, on one hand, and the area in which the actuating surface 20, on the other hand—here above the pushing element 31—influences the locking lever 18. The result is also the aforementioned convenient lever conditions, which allows the actuating surface 20 to have a relatively large pivoting movement of the locking pin 17 with relatively little lift.

The pushing element 31 of this embodiment example is designed in the shape of a very narrow, thin connecting flap, which is fed in a space-saving way through a corresponding small and narrow notch in the plug part 3. This notch is the recess 13 drawn with a longitudinal cut in FIG. 12; it extends all the way from one end 11 to the other end 12 of the receiving sleeve area 15.

The trajectory of the locking pin 17 between its locking and unlocking position is the same as mentioned for the first embodiment example. It is valid for the first as well as for the second embodiment example.

The preloading of the locking lever 18 in the direction of the locking position according to FIG. 15 is realized in this embodiment example through the preloading spring 35. The preloading spring 35 in this embodiment example holds the contact carrier as well as the bearing cup 32.

Figure 12:
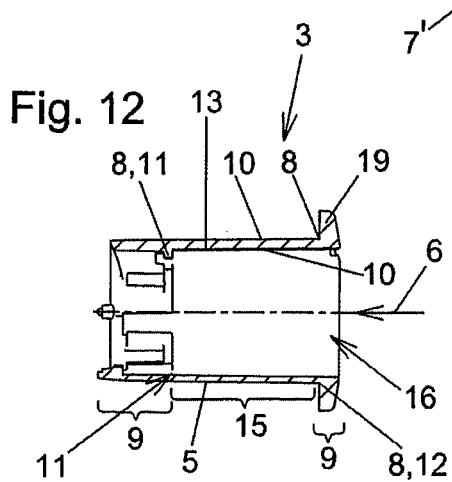
Figure 13:
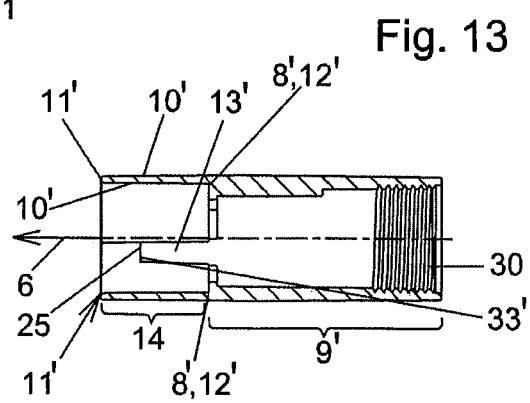

FIGS. 12 and 13 show in a longitudinal cut through the plug part housing 5, 5' of plug parts 3 and 4 of this embodiment example that in the respective plug region, in plug-in area 14 and in the receiving sleeve area 15 no recesses 13 exist according to the invention, which are limited by the two end areas 33 in the direction parallel to the plug-in direction 6 within the respective plug region. Therefore, there are no holes in the respective plug regions that are limited by two end areas 33. FIG. 12 shows that the only recess 13 here on the outer contour 10, existing opening 13 is reserved for the pushing element 31, extending, as mentioned, between both ends 11 and 12 of the entire receiving sleeve area 15. FIG. 13 shows that the plug part housing 5' of plug part 4 has an end area 33' in the plug-in area 14 or in its outer contour 10' in order to establish a locking counterpart 25. The adjacent recess 13', however, extends at least up to the front end 12 of the plug-in area 14 and is therefore also designed as part of the invention. The end area 33' forms the undercut, which serves as locking counterpart 25.

In FIG. 12 it may be seen that the receiving sleeve area 5 at its front ends 11 and 12 is limited against the rest of the plug part housing 9 via a step 8. The step 8, arranged close to the plug-in opening 16 on the outer side of the outer contour 10; the other step 8, at a distance from the plug-in opening 16 is arranged in the inner area of the outer contour 10. In the variant according to FIG. 13 there is only one step located in the inner area of the outer contour 10' at the front end 12'.

As a last point, it should be mentioned that the plug part housing 5, 5' of the plug parts 1, 2, 3, and 4, and especially their plug-in areas 14 and the receiving sleeve area 15 can be produced from different materials, e.g., metal or plastic. As a manufacturing process, different casting processes, especially die casting, plastic injection moulding, powder metallurgical manufacturing processes, but also other abrasive processes such as milling or the like are possible.

Finally, it will also be mentioned that the plug part 2 of the first embodiment example and the plug part 4 of the second embodiment example can also be put together as a plug connection, e.g., when two cables are to be connected with one another.

KEYS TO THE REFERENCE NUMBERS

1 Plug part
2 Plug part
3 Plug part
4 Plug part
5, 5' Plug part housing
6 Plug-in direction
7, 7' Plug contact
8, 8' Step
9, 9' Rest of the plug part housing
10, 10' Outer contour
11, 11' Front end
12, 12' Front end
13, 13' Recess
14 Plug-in area
15 Receiving sleeve area
16 Plug-in opening
17 Locking pin
18 Locking lever
19 Aperture
20 Actuating surface
21 Recess
22 Surface
23 Cable sleeve
24 Central longitudinal axis
25 Locking counterpart
26 Pivot axis pin
27, 27' Contact carrier
28, 28' Electrical contact
29, 29' Contact housing
30 Thread
31 Pushing element
32 Bearing cup
33, 33' End area
34 Pivot axis
35 Preloading spring

The invention claimed is:

1. Plug part, which has at least one plug part housing with at least one longitudinally extended plug region for the establishment of a plug connection with another plug part in a plug-in direction; in which the plug region has at least one of an electrical and an optical plug contact to establish at least one of an electrical and an optical connection with the other plug part; and there is at least one step arranged between the plug region and the rest of the plug part housing, wherein the plug part housing has a one-piece design and that the plug region has an outer contour, wherein the outer contour, apart from its end faces, as viewed in the plug-in direction has at least one recess, wherein each recess extends in a direction parallel to the plug-in-direction up to at least one of the end faces of the outer contour.

2. The plug part of claim 1, wherein the plug region is a plug-in area for insertion in the plug-in direction of the plug part into a receiving sleeve area of the other plug part or a receiving sleeve area with at least one plug-in opening, wherein a plug-in area of the other plug part can be plugged into the receiving sleeve area in the plug-in direction of the plug part.

3. The plug part of claim 1, wherein, the outer contour has at least two recesses, each extends in a direction parallel to the plug-in direction up to the same end face of the outer contour.

4. The plug part of claim 1, wherein the electrical connector housing is a one-piece casting part produced in one casting procedure.

5. The plug part of claim 1, wherein at least one of an electrical and an optical-plug contact of the plug part is accessible via one of the end faces, as viewed in the plug-in direction, of its plug region.

6. The plug part of claim 1, wherein, in the recess extending in the direction parallel to the plug-in direction up to at least one of the end faces of the outer contour, there is a locking pin to lock the plug part with another plug part.

7. The plug part of claim 6, wherein the locking pin is actuable by a pivotably mounted locking lever.

8. The plug part of claim 6, wherein the locking pin is part of a pivotable locking lever.

9. The plug part of claim 1, wherein the plug region has a mushroom-like shape in a front view.

10. The plug part of claim 1, wherein the plug part is a cable plug.

11. The plug part of claim 1, wherein the plug part is a device socket.

12. A method for manufacturing a plug part according to claim 1, wherein the plug part housing is produced with a casting process.

* * * * *